United States Patent [19]
Gaylord

[11] 3,744,102
[45] July 10, 1973

[54] STRAP CONNECTOR RELEASE
[75] Inventor: John A. Gaylord, Greenbrae, Calif.
[73] Assignee: H. Koch & Sons, Inc., Corte Madera, Calif.
[22] Filed: Feb. 22, 1972
[21] Appl. No.: 228,147

[52] U.S. Cl. ............................ 24/230 A, 244/151 A
[51] Int. Cl. ................................................ A44b 19/00
[58] Field of Search .................. 244/151 A, 151 B, 244/151 R; 294/83 A, 83 AE, 83 AB; 24/73 PH, 201 LP, 201 D, 230 LP, 230 NP, 230 AP, 230 R, 230 AS, 230 AT, 230 AK, 230 AL, 230 AN, 230 AM, 230 A, 230 AV

[56] References Cited
UNITED STATES PATENTS

| | | | |
|---|---|---|---|
| 2,845,676 | 8/1958 | Huber | 24/201 D |
| 2,992,467 | 7/1961 | Gaylord | 24/230 AN |
| 3,183,568 | 5/1965 | Gaylord | 24/230 A |
| 3,624,674 | 11/1971 | Gaylord | 24/230 AV |

FOREIGN PATENTS OR APPLICATIONS

| | | | |
|---|---|---|---|
| 230,751 | 12/1963 | Austria | 24/230 AT |

Primary Examiner—Donald A. Griffin
Attorney—George B. White

[57] ABSTRACT

In the strap connector release in this illustration, the male connector has a U-shaped forked frame which straddles a casing and is locked to the casing by opposite pins slideably extended through the sides of the casing into holes in the legs of the U-shaped frame. Means are provided in the casing actuated by gas pressure to pull the pins inwardly of the casing and out of the holes of said legs, thereby releasing the male strap connector.

9 Claims, 8 Drawing Figures

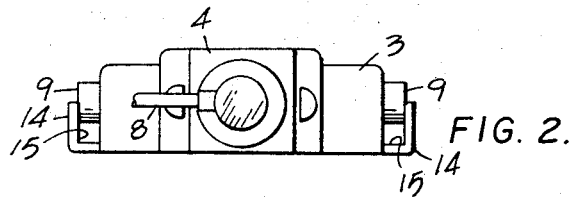
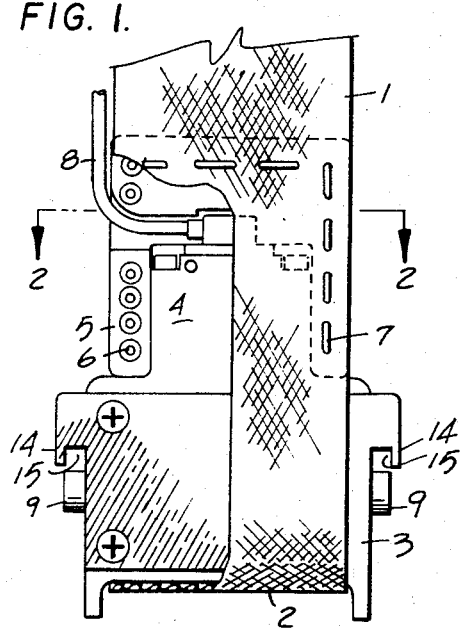
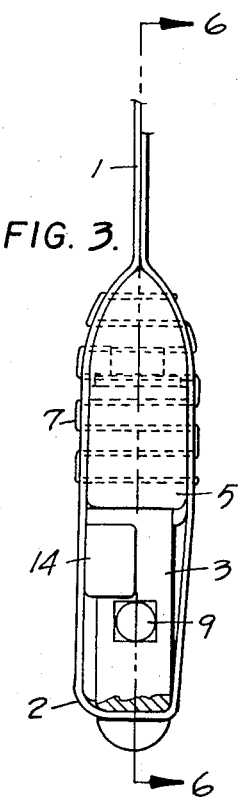
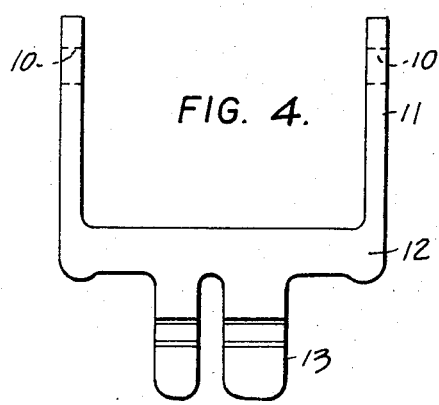
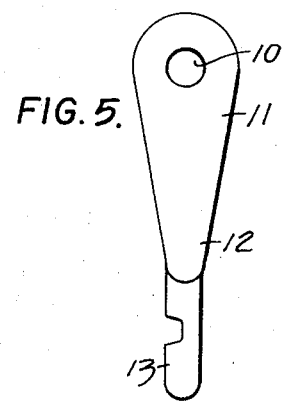

PATENTED JUL 10 1973
3,744,102
SHEET 2 OF 2
FIG. 6.
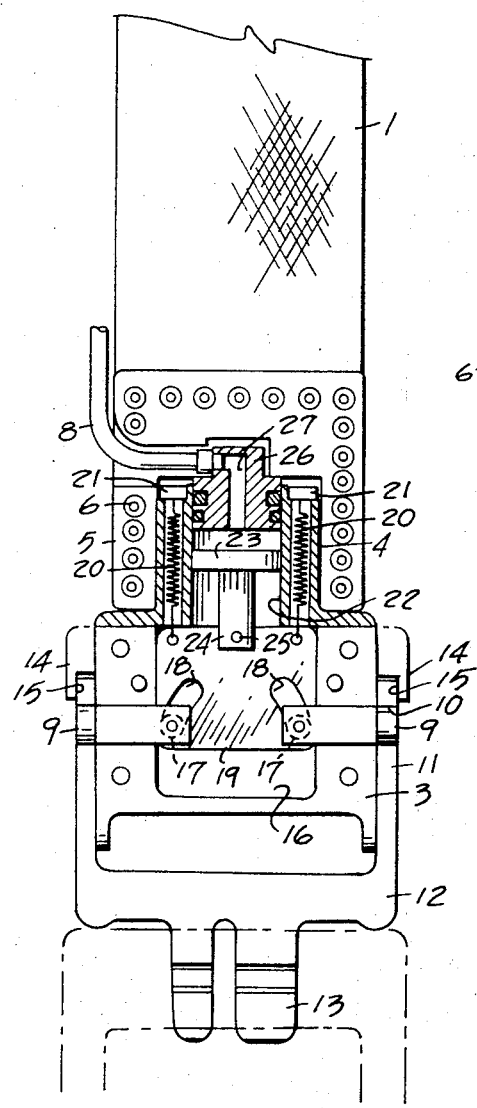
FIG. 8.
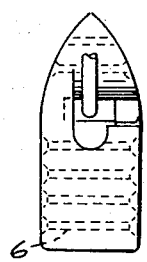
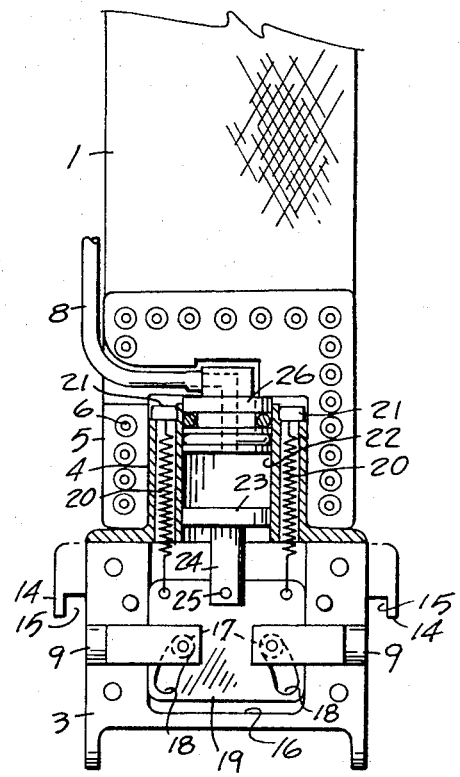
FIG. 7.
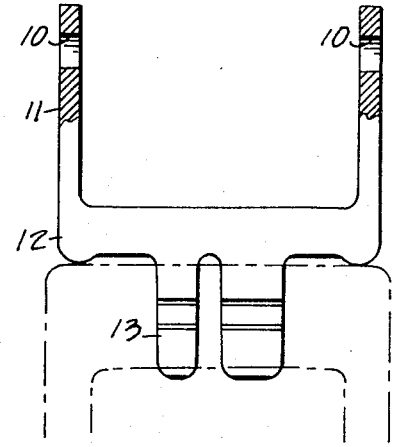

STRAP CONNECTOR RELEASE

BACKGROUND OF THE INVENTION

In addition to the convenient manually releasable strap connectors of the type shown, for instance, in U.S. Pat. No. 3,183,568, it became necessary to provide an automatic release actuated by suitable gas pressure, in case of emergency when aircraft personnel must escape from the parachute harness or must free himself from the parachute and is unable to or has no time to actuate the individual manual releases of the strap connectors.

The primary object of the invention is to provide a strap connector, in addition to the manually releasable strap connectors, adapted for instantaneous automatic separation when gas pressure is applied.

BRIEF DESCRIPTION OF DRAWINGS

FIG. 1 shows the gas actuated separator installed in a strap.

FIG. 2 is a view taken on lines 2—2 of FIG. 1.

FIG. 3 is a side view of the installed gas actuated separator.

FIG. 4 is the yoke on the male connector adapted to co-operate with the device shown in FIG. 1.

FIG. 5 is a side view of the yoke on the male connector.

FIG. 6 is a sectional view taken substantially on lines 6—6 of FIG. 3, showing the male connector in connected position.

FIG. 7 is a sectional view showing the male connector released.

FIG. 8 is a detail side view of the mounting means and the accommodation of the gas line.

DETAILED DESCRIPTION

On the end of the strap 1 is formed a loop 2 into which is inserted a casing 3 provided with a gas actuator 4. In this form a flange 5 on the gas actuator 4 is sewn through holes 6 and stitches 7 to the loop 2. A gas conduit 8 leads from one side in the top of the gas actuator 4. A pair of pins 9 extend from the opposite sides of the casing 3 for engagement with holes 10 in the legs 11 of a U-shaped yoke 12 forming the body of the usual male connector provided with suitable prongs 13 insertable in the female portion of the strap connector shown in said patent.

The casing 3 has a wing 14 extended from each side spaced above the pins 9 forming a pocket 15 to accommodate the tips of the legs 11 of the yoke 12.

As shown in FIG. 6, the pins 9 extend into a recess 16 and are provided with suitable rollers 17 which ride in arcuate upwardly converging slots 18 in a reciprocating plate 19 in the casing 3.

In the gas actuator 4 secured on top of the casing 3 are a pair of coil springs 20 anchored at one end in the top of the reciprocating plate 19 and at their other ends in suitable plugs 21 in the top of pockets accommodating the springs to normally pull the plate 19 upwardly thereby to move the pins 9 outwardly into engaging position shown in FIG. 6.

The recess 16 is longer than the height of the plate 19 so that in the locking position the lower edge of the plate 19 is spaced from the bottom of the recess 16 permitting the downward shifting of the plate 19. Thus when the plate 19 is shifted downwardly, viewing FIG. 6, against the action of the springs 20, the rollers 17 move toward one another in the converging slots 18 thereby to pull the pins 9 out of the holes 10 of the legs 11 of the yoke 12. The length and the angle of incline of the slots 18 are such that when the rollers 17 reach the upper end of the slots 18, the pins 9 are completely withdrawn into the casing 3 and out of said holes 10.

In the gas actuating device 4 is formed a cylinder 22 in which works a piston 23, the stem 24 of which is secured by a pin 25 to the top of the plate 19. In the head 26 of the cylinder 22 is an intake passage 27 connected by the conduit 8 to a source of gas pressure.

In operation, whenever in an emergency gas under pressure is released into the conduit 8, it presses the piston 23 away from the cylinder head 26 thereby to shift the plate 19 toward the bottom of the recess 16, thereby moving the slots 18 over the rollers 17 and pulling the pins 9 into concealed position and out of the holes 10 of the legs 11 of the yoke 12, accomplishing the separation of the strap 1. This operation or structure and the herein release does not interfere with the manipulable disconnect devices of which the yoke 12 would form a part.

I claim:

1. A strap connector release device, comprising
    a casing having opposite side apertures,
    locking elements reciprocable through said apertures from an initial projecting locking position to a withdrawn releasing position,
    a separable strap connecting member straddling said casing and being engageable by the respective locking elements,
    a power transmission member reciprocable in said casing,
    connecting means between said locking elements and said power transmission member to reciprocate said locking elements in said apertures between an initial locking and a releasing position as said power transmission member is reciprocated,
    means to apply power to move said power transmission member from said initial position to a position for withdrawing said locking elements into said releasing position,
    resiliently yieldable means to urge said power transmission means into said initial position,
    means to mount said casing on a strap,
    and means to connect said separable strap connecting member to another strap.

2. The strap connector release specified in claim 1, and
    said separable strap connecting member being
    a manually releasable male connector element for a releasable strap connector.

3. The strap connector release specified in claim 1, and
    said separable strap connecting member including,
    a yoke,
    the legs of said yoke straddling said casing, and having apertures therein engageable by the respective locking elements.

4. The strap connector release specified in claim 1, and
    said means to connect said separable strap connecting member to another strap being prongs insertable into a female strap connector.

5. The strap connector release specified in claim 1, and
    said casing having a cavity therein, said power transmission member being reciprocable in said cavity, and connecting means between said power transmission member and said locking elements reciprocating said elements oppositely and transversely of the reciprocation of said transmission member respectively to withdraw and to project said locking elements into and out of said casing.

6. The strap connector release specified in claim 1, and said means to apply power to said power transmission means including, a cylinder on said casing, a piston working in said cylinder and connected to said power transmission member for moving said transmission member from said initial position into releasing position, and a conduit connected to said cylinder for conducting gas under pressure into said cylinder for moving said piston.

7. The strap connector release specified in claim 1, and said casing having a cavity therein, said power transmission member being a plate reciprocable in said cavity, said locking elements being pins extended through said apertures, said separable strap connecting member, having legs straddling said casing and having apertures therein engageable by said pins respectively, said connecting means between said locking elements and said power transmission member, including guides on said plate converging toward the initial position of said plate, and friction rollers on said pins, said guides being movable relative to said rollers for reciprocating the said pins oppositely to one another.

8. The strap connector release specified in claim 7, and said means to apply power including a cylinder on said casing, a piston working in said cylinder and connected to said plate, and conduit means to conduct gas under pressure into said cylinder for moving said piston towards said plate, thereby to move said plate from said initial position.

9. The strap connector release specified in claim 8, and said resiliently yieldable means being springs adjacent said cylinder and mounted to pull said plate toward said cylinder thereby to move said piston inwardly to said cylinder into an initial pin locking position.

* * * * *